March 19, 1935.  G. H. WEBB  1,995,163
COLLAPSIBLE SUPPORT
Filed May 21, 1932
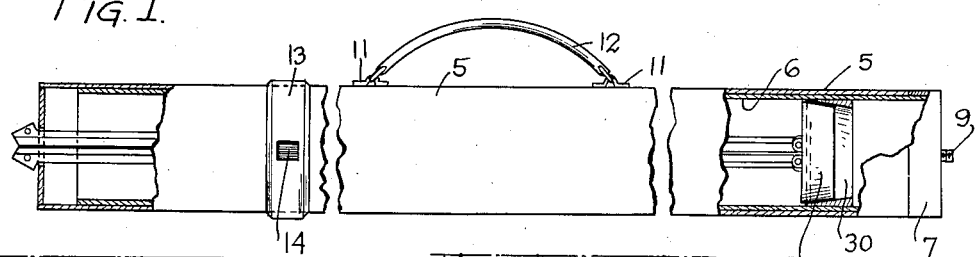
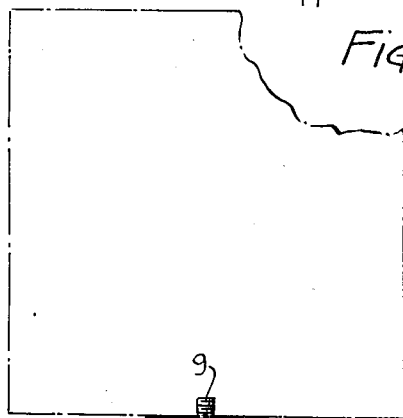
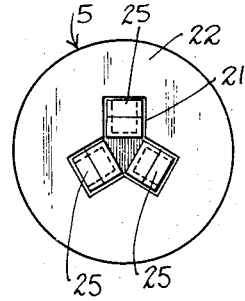
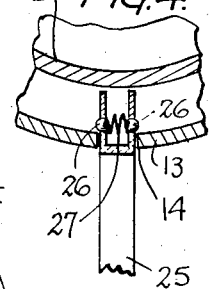
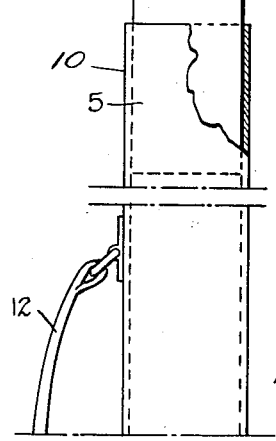
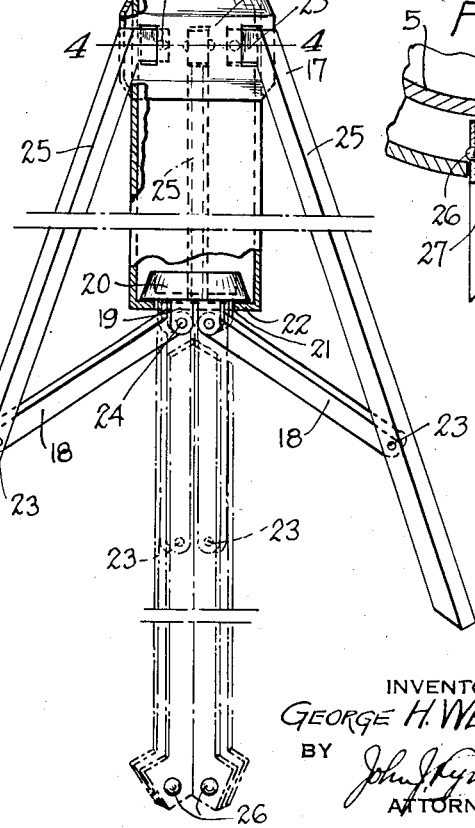
INVENTOR:
GEORGE H. WEBB
BY
ATTORNEY Patented Mar. 19, 1935

1,995,163

UNITED STATES PATENT OFFICE 1,995,163

COLLAPSIBLE SUPPORT

George H. Webb, Glendale, Long Island, N. Y.

Application May 21, 1932, Serial No. 612,705

3 Claims. (Cl. 248—43)

This invention relates to telescopic supports and in particular to those of the tripod type which are employed with cameras or with other devices that are to be supported in spaced relation with the ground and which it is desired to easily collapse and transport.

A particular object of my invention is to provide a telescopic support which, to a minimum length has few parts, is light of weight, makes use of one of its parts as a carrying case and which feature is an important object of my invention.

A still further object of the invention is to provide means for folding the legs of the device together and then projecting them into one of the telescopic parts of the device so that they are completely hidden from view but when drawn out and moved to their supporting position are sturdy and do not collapse when the device is picked up for movement from place to place as in the taking of pictures where it is necessary to focus the camera from different angles and necessary to carry the tripod around with the camera and set it up at different locations.

A still further object of my invention is to provide a device of the character referred to which is particularly adapted for use with cameras and which can be raised to a maximum height or dropped to a minimum height so that the photographing of small subjects near the ground may be facilitated without changing the position of the legs of the device.

Changes and variations may be made in the construction shown and described without departing from the principles of the invention or sacrificing its chief advantages; hence such invention is not to be confined to the structures shown in the accompanying drawing, in which;

Figure 1 is a view in elevation of telescopic supports constructed in accordance with my invention, parts thereof being broken away to disclose the interior position of the parts when the device is not in use, this figure also illustrating the function of one of the telescopic sections as a carrying case for the remainder of the support construction.

Figure 2 is an enlarged end view of the device as illustrated in Figure 1.

Figure 3 is a section in elevation of the device as it would appear when extended, the position of the legs being shown in outline in their folded positon after having been withdrawn and in full lines in open position to support the device.

Figure 4 is an enlarged section taken on the lines 4—4 of Figure 3 illustrating how the ends of the legs are snapped into position on the lower section of the support, and Figure 5 is a continuation of the Figure 3 and illustrates the upper portion of the device.

Referring to the drawing in detail, 5 indicates an outer tubular section and 6, an inner tubular section which has sliding frictional fit with each other so that the inner section 6 may be drawn out or extended to the proper height to suitably adjust the height of the camera above the ground to the subject being photographed. If desired, the tubular section 6 may be provided with a ring or ferrule 7 at one end to limit the collapsing movement of the member 6 into member 5 and to provide a flush surface throughout the length of the device. The outer end of the tube 6 is preferably closed and arranged to hold the stud washer or disk 8 which carries the threaded stud 9 projecting through a suitable opening in the end of the tubular member 6. This threaded stud extending slightly is arranged to be threaded into a suitable opening in a camera that may be supported on the upper end of the device. The tubular member 6 is drawn out through the end 10 of the outer tubular section 5 which section constitutes a carrying case for the device and on its outer surface is provided with the brackets 11 which are secured in any suitable manner to the exterior surface of the member 5 and are arranged to hold the ends of the handle 12. This member 5 is also provided with a ferrule or ring 13 having openings 14 therein spaced substantially 120 degrees apart for the accommodation of three legs that are employed in supporting the device, it being understood that any number of openings may be provided depending upon the number of legs used in the support. This ring 13 is provided with a bevel 15 at its edges and is secured by soldering or otherwise to the member 5 and is so shaped by the bevel 15 that its mid portion 16 is in spaced relation with the outer surface of the member 5 so that the member 13 is employed in securing the ends of the legs to the outer surface of the member 5 when the device is in use.

In order to support the telescopic sections 5 and 6 in spaced relation with the ground, use is made of the legs 17, three of which are provided for the purpose of illustration, to constitute a tripod, each of the legs 17 being connected through the medium of a link 18 with an ear 19 secured on one side of a flanged cup 20 disposed within the member 5 so that when the legs are in use, the ears 19 thereof extend through a suitable opening 21 in the closed end 22 of the member 5. The legs 17 are substantially U-shaped in cross section and have pivoted thereto as at 23, the ends of the links 18, the opposite ends of the links being pivoted as at 24 to the ears 19, before referred to, so that from the position illustrated in outline in Figure 3, the legs 17 are folded or turned about the pivot point 23 until the ends 25 thereof are in position to be snapped into the openings 14 of the ring 13. In order to removably connect the ends 25 of the legs 17 with the ring 13, use is made of detent balls 26 positioned in suitable depressions in the inner walls of the legs 17 and maintained in the depressions through the medium of springs 27. It is quite evident that when the end 25 of the leg is projected through the opening 14 of the ring 13, the balls will yield but will snap out and imprison the end of the leg 17 in the ring 13 so that its subsequent detachment is readily performed, but when the device is picked up, as a whole in use, the legs will not collapse and the device may be moved from place to place during the taking of pictures without any attention to the legs, the device being portable and compact and particularly adapted for use of the amateur.

In order that the legs may be secured within the inner tubular portion 6 when the device is collapsed, the said portion 6 is provided with a cup 30, the wall of which is tapered, the cup being secured in position in any suitable manner such as by soldering and being arranged to frictionally receive and hold the tapered flange of the cup 20 to which the ears 19 are secured so that, as illustrated in Figure 1, when the legs are pushed through the end opening 21 of the member 5, the cup 20 will frictionally engage in the cup 30 carried by the member 6 and in opening the device, the projecting end of the member 6 beyond the member 5 is drawn upon and the detent balls 26 in the ends of the legs will prevent the ends of the legs from being drawn completely through the opening 21 in the end of the member 5 with the result that the cup 30 will pull off the cup 20 and permit the legs to be drawn out and opened to supporting position after which the member 6 may be adjusted to suit the conditions.

It is evident, therefore that I have provided a telescopic support which may be collapsed to a minimum height, can be moved from place to place without adjustment of the legs each time, is portable and compact and particularly adapted for the use of the amateur and can be quickly and easily adjusted to proper height to suit the photographic subject.

It is also evident that I have made use of one of the telescopic sections of my device as a carrying case and by suitably coloring the outer section 5, it may be made ornamental and may be carried from place to place without the necessity of using a leather covering or any other device that is now commonly employed to carry the tripod about in.

My invention is not to be restricted to the precise details of construction shown since various changes and modifications may be made therein without departing from the scope of the invention or sacrificing the advantages derived from its use.

What I claim is:—

1. In a device of the character described, a plurality of frictionally interfitting tubular members, one of said members constituting a carrying casing and having an opening in one end thereof, a plurality of legs in said member arranged to be withdrawn through said opening and secured to said member to support the device and means at one end of each leg for limiting the withdrawal movement of the legs.

2. In a device of the character described, a plurality of frictionally interfitting tubular members, one of said members having an opening in one end thereof, a plurality of legs in said member arranged to be withdrawn through said opening and secured to one of the members to support the device in usable position, means for releasably holding said legs in concealed position within said members, and said means being operable upon a withdrawal of one of said interfitting tubular members to release said legs whereby the same may be withdrawn through the opening.

3. In a device of the character described, a plurality of frictionally interfitting tubular members, one of said members having an opening in one end thereof, a plurality of legs in said member arranged to be withdrawn through said opening, means for limiting said withdrawal movement including a cup, and links pivotally connecting said legs and cup, latching means in the ends of said legs and means on one of said tubular members to which the ends of said legs may be releasably secured by said latching means.

GEORGE H. WEBB. [L. S.]